United States Patent [19]

Allen

[11] 4,212,623
[45] Jul. 15, 1980

[54] APPARATUS FOR COOLING PLASTIC INJECTION MOLD DIES

[75] Inventor: Paul E. Allen, Newtown, Conn.

[73] Assignee: Logic Devices, Inc., Bethel, Conn.

[21] Appl. No.: 7,864

[22] Filed: Jan. 31, 1979

Related U.S. Application Data

[62] Division of Ser. No. 892,592, Apr. 3, 1978, Pat. No. 4,151,243.

[51] Int. Cl.² .............................................. B29F 1/08
[52] U.S. Cl. ..................................... 425/547; 249/63; 249/79; 249/141; 425/577; 425/405 R; 425/812
[58] Field of Search .................... 425/405 R, 547, 577, 425/812, DIG. 60; 264/219, 328; 249/63, 64, 79, 141

[56] References Cited

U.S. PATENT DOCUMENTS

| 2,976,571 | 3/1961 | Moslo | 249/141 |
|---|---|---|---|
| 3,108,339 | 10/1963 | Bucy | 425/812 |
| 3,145,422 | 8/1964 | Daubenberger et al. | 425/812 |
| 3,555,620 | 1/1971 | Bucy | 425/812 |
| 3,978,910 | 9/1976 | Gladwin | 249/79 X |
| 4,091,069 | 5/1978 | Allen | 249/79 X |

Primary Examiner—J. Howard Flint, Jr.
Attorney, Agent, or Firm—Thomas L. Tully

[57] ABSTRACT

A method and apparatus for forming a continuous cooling liquid passageway through two separable injection mold dies when they are closed with a supply system flowing cooling liquid at a less than atmospheric pressure at least at the junction of the dies through the passageway only when the dies are closed and air when the dies are opened and the passageway is discontinuous.

9 Claims, 2 Drawing Figures

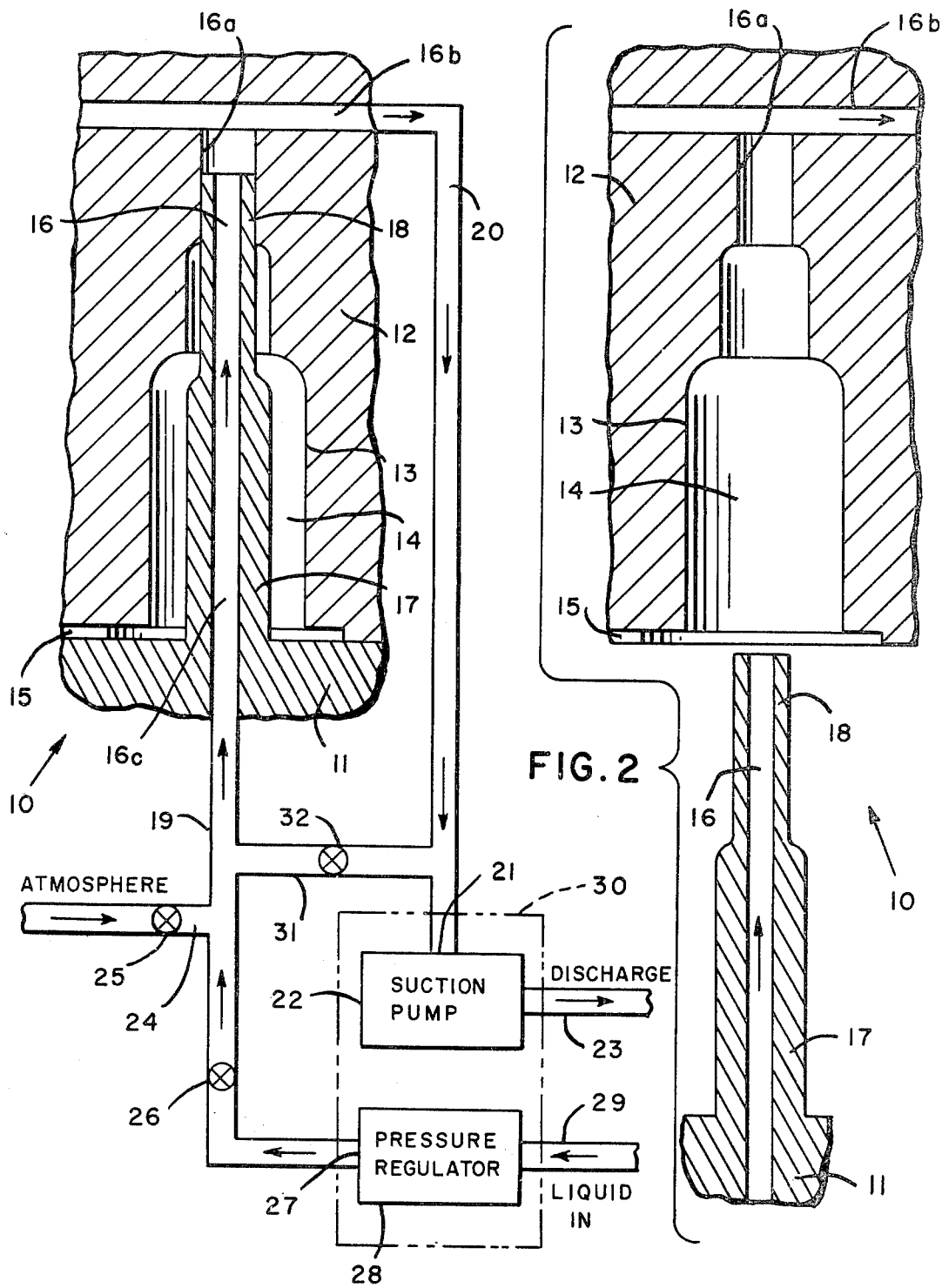

APPARATUS FOR COOLING PLASTIC INJECTION MOLD DIES

This is a division of application Ser. No. 892,592, filed Apr. 3, 1978, now U.S. Pat. No. 4,151,243, issued Apr. 24, 1979.

In the injection molding of plastic articles having a through bore, such as tubing type articles, generally a mold consisting of a movable mold die and a stationary mold die are employed. One of the dies generally has a cavity that defines the exterior shape of the article while the other die has a core which extends into the cavity to define the hollow bore of the article. In some instances, the core may have such a relatively small cross-section that the usual continuous cooling liquid passageway is not capable of being formed therein. In the absence of such a cooling passageway, the molding cycle duration is accordingly lengthened due to the inability to cool the core. One type of plastic article to which the present invention is applicable is the barrel of a hyperdermic syringe which may have a through bore of perhaps only 0.050 inches to contain the needle.

It is accordingly an object of the present invention to provide a cooling liquid passageway in a small size core of a plastic injection mold having two separable dies.

Another object of the present invention is to form a portion of a cooling liquid passageway in each of two separable mold dies and to control the flow of cooling liquid therethrough in a manner which prevents the cooling liquid from contacting the injected plastic material.

A further object of the present invention is to achieve the above objects in a manner which may be economically incorporated in a mold dies and which is readily connectible for use with a commercially available cooling liquid supply system.

In carrying out the present invention, there is provided an injection mold consisting of a movable die and a stationary die with the plastic material being injected when the dies are closed and with the article being removed by separating the dies after the material has hardened. A cooling liquid passageway has a portion formed in one die and a portion formed in the other die so that when the dies are closed, a continuous passageway is formed. One end of the passageway is connected to a suction pump that maintains a less than atmospheric pressure in the passageway at least at the junction of the two portions, while the other end of the passageway is alternatively connected to a source of air and cooling liquid.

With such a construction and supply system, cooling liquid is permitted to flow at a less than atmospheric pressure through the passageway only when the dies are closed and this flow serves to reduce the time required for cooling the plastic articles as compared to a mold die that cannot be formed with a cooling passageway. However, to prevent the cooling liquid from contacting the plastic material and possibly producing unsatisfactory articles, the flow of cooling liquid in the passageway is stopped prior to the opening of the dies. In one embodiment of the invention, air is introduced into the complete passageway prior to the opening of the dies and flows to remove all cooling liquid in the passageway. In another embodiment, air is introduced only at the junction or separation of the portions to flow through both portions to remove cooling liquid that would be available to contact the plastic material and produce an unsatisfactory article. Thus in both embodiments of the invention, the cooling liquid is permitted to flow only when the dies are closed with air being caused to flow at all other times.

Other features and advantages will hereinafter appear.

In the drawing

FIG. 1 is a view of an injection mold interconnected with a fluid control system with the mold dies being shown in their closed condition.

FIG. 2 is a view of the mold dies in their separated condition.

Referring to the drawing, an injection mold is generally indicated by the reference numeral 10 and includes a movable die 11 and a stationary die 12. The stationary die 12 has a formed depression 13 therein which defines the exterior shape of a mold cavity 14 into which plastic is injected through a gate 15. A portion of a cooling liquid passageway 16 is formed in the stationary die 12 and includes an entrance 16a and a discharge 16b formed in the die 12.

The movable die 11 is formed to include a core 17 which defines the interior shape of the cavity 14 and it will be noted that the core forms a through bore in the cavity by having a tubular extension 18 which fits within the entrance 16a when the dies are closed. A portion 16c of the cooling liquid passageway 16 extends through the core 17.

The passageway 16 has an end of the portion 16c connected as the inlet of the passageway to a pipe 19 while an end of the discharge 16b constitutes the passageway outlet and is connected to a pipe 20. The outlet pipe 20 is connected to the inlet 21 of a constant displacement suction pump 22 having a discharge 23. The suction pump is continually operated to maintain a less than atmospheric pressure in the passageway 16. The inlet pipe 19 is connected to a duct 24 that is open to the atmosphere through a valve 25 and also, through a valve 26, to an outlet 27 of a pressure regulator 28 to which is supplied pressurized cooling liquid on an inlet line 29.

Accordingly, with the suction pump being continuously operated, the opening of the valve 25 and closure of the valve 26, only enables air to be drawn into the passageway 16 while with the valve 25 closed and the valve 26 open, only cooling liquid, such as water, is caused to flow through the passageway 16.

The suction pump and pressure regulator are shown included within a dotted line block 30 as they constitute part of a fluid control system that is commercially available from Logic Devices, Inc., Sandy Hook, Conn. A fuller description of the system 30 including the above components is set forth in my co-pending U.S. Patent application, Ser. No. 733,812 and entitled "Cooling System for Plastic Molds".

In the operation of the present system with the mold die closed as shown in FIG. 1, cooling liquid is caused to flow through the passageway 16 by the valve 26 being opened and the valve 25 being closed with the liquid being discharged through the suction pump 22. Prior to the separating of the mold dies after the cavity has been filled by injection of plastic material through the gate 15, the valve 26 is closed and the valve 25 is opened. This stops the flow of cooling liquid while enabling the suction pump 22 to suck air from the atmosphere through the passageway 16. The flow of air removes any water in the passageway 16, so that when the mold dies are separated, both portion of the passageway are entirely free of cooling liquid.

The valve 25 is maintained opened for the remainder of the molding cycle, until the molds are again closed for the next cycle, at which time the valve 25 is closed and the valve 26 is open to again permit flow of cooling liquid.

It will be appreciated, though the present invention is not to be considered as being limited thereto, that if the minimum cross-sectional dimension of the core 17 is on the order of 1/10 of an inch or so, that heretofore a cooling passageway could not be formed therein as two side-by-side independent passages had been required to be formed. Hence, such dies had been operated without cooling the core. However, with the present invention where only a single passage need be formed, cooling liquid may pass through the core 17 and the time required to cool the plastic material in the dies accordingly is substantially reduced thereby decreasing the molding cycle time and hence the cost of the article.

While the above method of operation utilizes the air valve 25 for controlling the passage of air into the passageway 16, it is also contemplated that the valve 25 may be eliminated and air permitted to enter into the entrance 16a when the two portions of the passageway become disconnected by the dies becoming opened. Air can then flow through the parting lines of the dies and along the surface of the depression 13 and into the entrance 16a. When this air flow occurs, any available liquid within the portion of the passageway in the die 12 will be sucked along with the air to be discharged by the suction pump 22. Further, any liquid that is in the portion 16c of the passageway in the die 11 will flow through a pipe 31 connected between the inlet pipe 19 and the outlet pipe 20 as a valve 32 will become opened. Thus, both portions of the passageway will be connected to the suction pump and cleared of cooling liquid. Even if some liquid should escape when the passageway becomes discontinuous, it would be drawn with the air into the junction between the passageway portions and thus be prevented from contacting the plastic material present in the mold cavity or being on the surface of the mold cavity when the plastic material is injected to possibly cause the production of unsatisfactory articles. The operation of the valve 26 is not altered in this embodiment of the invention from that described previously and the valve 32 is preferably maintained opened for the duration that the valve 26 is closed.

While the valves 25 and 26 have been shown as being individually operable valves, it is contemplated that, if desired, a solonoid operated three-way valve may be employed so that the operation of the valves may both be automatically timed with the molding cycle and provide assurance that only one of them will be open at a time. Similarly, in the alternative embodiment, the valves 26 and 32 may be three-way valves, if desired.

Through the specific embodiment of the invention herein disclosed has been directed to a mold having a core, it is contemplated that the invention may be used in other than such specific dies where it is desired to flow cooling liquid through both dies.

While the specifically described embodiment shows the extension 18 fitting within the entrance 16a, it is considered to be within the scope of the present invention to alternatively have the portions of the dies forming the passageway be flush to form an abutting junction. Further, with such an abutting junction and even with the overlapping junction shown, it is contemplated that the junction may have a small clearance on the order of a few thousands of an inch to permit venting of the mold cavity into the cooling system if desired as disclosed in my copending U.S. Patent application, Ser. No. 769,488 and entitled Venting Mold Cavities, now U.S. Pat. No. 4,091,069, issued May 23, 1979.

The clearance should, of course, not be sufficiently large as to enable plastic material to flow therein and form an unsatisfactory article.

It is also considered that the evacuation of the liquid from the passage may be accelerated if the valve 25 is connected to a source of air at higher than atmospheric pressure. The pressure should be selected so as not to force liquid into the mold cavity and cause unsatisfactory articles.

It will accordingly be understood that there has been disclosed a method and apparatus for cooling a plastic mold having a movable die and a stationary die. In accordance with the present invention, a cooling liquid passageway is formed with a portion of the passageway in the movable die and a portion of the passageway in the stationary die so that when the dies are closed for forming the article, a continuous passageway is formed through which cooling liquid is caused to flow. However, when it is desired to open the dies, the passage of cooling liquid is prevented and air is introduced into the passageway either thorugh the complete passageway as in one embodiment or through the separation between the two portions as in another embodiment. Both embodiments however, cause the removal of any cooling liquid which could contact the plastic material and produce an unsatisfactory article by having a less than atmospheric pressure in the passageway at least at the junction of the two portions.

Variations and modifications may be made within the scope of the claims and portions of the improvements may be used without others.

I claim:

1. A mold having a mold cavity for producing plastic injection articles comprising a movable die and a stationary die, means forming a portion of a cooling passageway in one die, means forming a portion of a cooling passageway in the other die, said passageways being so formed and positioned to effect a continuous passageway when the dies are abutting and a discontinuous passageway when the dies are separated.

2. The invention as defined in claim 1 in which one of the dies includes a core and in which the portion of the passageway in said one die extends through the core.

3. The invention as defined in claim 1 in which the dies are dimensioned to have a slight clearance therebetween when abutting with the clearance providing communication between the continuous passageway and the mold cavity.

4. An apparatus for producing plastic injected molded articles in a mold cavity comprising an injection mold having a movable die and a stationary die, means forming a portion of a cooling passageway in one die, means forming a portion of a cooling passageway in the other die, said portions being so formed and positioned to effect a continuous passageway when the dies are abutting, means for applying a less than atmospheric pressure to one end of the passageway and means for selectably connecting or disconnecting the other end of the passageway to a source of cooling liquid.

5. The invention as defined in claim 4 in which there are means for permitting air to flow in at least one portion of the passageway when the other end of the passageway is disconnected from the source of cooling liquid.

6. The invention as defined in claim 5 in which the last named means includes a duct communicating between the atmosphere and the other end of the passageway and in which there is a valve in said duct to control the flow of air therethrough.

7. The invention as defined in claim 5 in which air is capable of flowing between the dies when they are not abutting, in which the portion of the passageway having the one end to which the less than atmospheric pressure is applied has an entrance and in which the entrance communicates with the air that flows between the dies.

8. The invention as defined in claim 7 in which there are means for communicating the other end of the passageway to the means for applying a less than atmospheric pressure and in which the portion having the other end has an entrance communicating with the air that flows between the dies.

9. The invention as defined in claim 4 in which the portions defining the passageways have a small clearance therebetween that communicates with the mold cavity.

* * * * *